(12) United States Patent
Crews

(10) Patent No.: US 9,067,561 B2
(45) Date of Patent: Jun. 30, 2015

(54) VEHICLE SEAT HARNESS ANCHORING SYSTEM

(71) Applicant: Shawn Crews, Largo, FL (US)

(72) Inventor: Shawn Crews, Largo, FL (US)

(*) Notice: Subject to any disclaimer, the term of this patent is extended or adjusted under 35 U.S.C. 154(b) by 0 days.

(21) Appl. No.: 14/071,566

(22) Filed: Nov. 4, 2013

(65) Prior Publication Data

US 2015/0123449 A1    May 7, 2015

(51) Int. Cl.
| | |
|---|---|
| *A47D 15/00* | (2006.01) |
| *A62B 35/00* | (2006.01) |
| *B60R 22/00* | (2006.01) |
| *B60R 22/22* | (2006.01) |
| *B60R 22/10* | (2006.01) |

(52) U.S. Cl.
CPC .............. *B60R 22/22* (2013.01); *B60R 22/105* (2013.01)

(58) Field of Classification Search
CPC ... B60N 2/2806; B60N 2/2812; B60R 22/105
USPC ......................................... 297/464, 467, 484
See application file for complete search history.

(56) References Cited

U.S. PATENT DOCUMENTS

| | | | | |
|---|---|---|---|---|
| 3,301,594 | A * | 1/1967 | Pukish, Jr. .................... | 297/467 |
| 4,488,691 | A * | 12/1984 | Lorch ........................ | 297/484 X |
| 4,738,413 | A * | 4/1988 | Spinosa et al. ............ | 297/467 X |
| 6,547,334 | B1 * | 4/2003 | Girardin ....................... | 297/484 |
| 6,863,350 | B1 * | 3/2005 | McCulley et al. ......... | 297/467 X |
| 7,673,945 | B1 * | 3/2010 | Riffel et al. ............... | 297/467 X |
| 7,770,969 | B2 * | 8/2010 | Boyle et al. ............... | 297/484 X |
| 8,113,584 | B2 * | 2/2012 | Boyle et al. ............... | 297/484 X |
| 8,210,617 | B2 * | 7/2012 | Aaron et al. .................. | 297/484 |
| 8,419,127 | B1 * | 4/2013 | Wilhelm et al. .......... | 297/484 X |
| 8,794,709 | B2 * | 8/2014 | Kennedy .................... | 297/467 X |
| 2003/0173817 | A1 * | 9/2003 | Vits et al. ...................... | 297/484 |
| 2007/0001495 | A1 * | 1/2007 | Boyle et al. ............... | 297/484 X |
| 2007/0040441 | A1 * | 2/2007 | Boyle et al. .................. | 297/467 |
| 2014/0042793 | A1 * | 2/2014 | Fiore ............................ | 297/484 |

* cited by examiner

*Primary Examiner* — Rodney B White
(74) *Attorney, Agent, or Firm* — Inventions International Inc.; Tiffany C. Miller

(57) ABSTRACT

A vehicle seat harness anchoring system is disclosed. The vehicle seat harness includes straps which fit over the body of a person and also fit over the legs of a person. Some of the straps are adjustable to securely hold the person in the harness. The harness anchoring system is attached to the vehicle seat harness. The harness anchoring system consists of a mixture of several fixed length and adjustable length anchoring straps. One end of the anchoring straps is either attached to an anchor plate or to an anchor point on a vehicle. The other end of the anchoring straps is attached to the vehicle seat harness.

12 Claims, 7 Drawing Sheets

VEHICLE SEAT HARNESS ANCHORING SYSTEM

RELATED APPLICATIONS

There are no related applications for this application.

FIELD

The field of the invention relates generally to devices utilized for anchoring a person, particularly a child, to a vehicle seat.

BRIEF DESCRIPTION

A vehicle seat harness anchoring system is disclosed. The vehicle seat harness includes a left adjustable harness strap, a right adjustable harness strap and a chest buckle. The harness anchoring system includes an upper left anchor system strap attached to the cleat on the top of the left adjustable harness strap, an upper right anchor system strap attached to the cleat on the top of the right adjustable harness strap, an upper right adjustable anchoring strap attached to the upper left and upper right anchor system straps, an upper left anchoring strap attached to the upper left and upper right anchor system straps and attached to the anchoring plate at the opposite end of the strap, a lower left anchoring strap attached to the bottom of the left adjustable harness strap, a lower right anchoring strap attached to the bottom of the right adjustable harness strap, and a lower middle adjustable anchoring strap attached to a lower buckle where the opposite side of the lower buckle is attached to the bottom or the left and right adjustable harness straps. Each of the upper right adjustable anchoring strap, lower left and right anchoring straps, and the lower middle adjustable anchoring straps have a free end to anchor to an anchoring plate or a vehicle anchoring point and a fixed end connected to the vehicle seat harness. The upper left anchor strap is attached to the anchoring plate.

The left adjustable harness strap and the right adjustable harness strap of the vehicle seat harness are adjustable in length. The upper left anchoring strap, the upper right anchoring strap, the lower left anchoring strap and the lower right anchoring strap of the harness anchoring system are not adjustable in length in one preferred embodiment. However, any of the straps may be made adjustable or not adjustable as is suitable for a harness that attaches and anchors in the way that the system of the preferred embodiments attaches and anchors.

When using the harness, a user places the harness anchoring system on a vehicle seat. The attached anchoring straps of the harness anchoring system are either attached to an anchor plate connected to the upper left anchoring strap, or are attached to anchoring points on a vehicle so that the harness anchoring system is secured to a vehicle seat. In use, a user sits in the harness, and the harness is secured to the user. Once adjusted, the vehicle seat harness anchoring system may remain in the vehicle seat and may be reused with minimal further adjustments. The vehicle seat harness anchoring system may also be removed at any time and transferred to another seat in the same vehicle, or to a seat in another vehicle.

DETAILED DESCRIPTION

Figure 1:
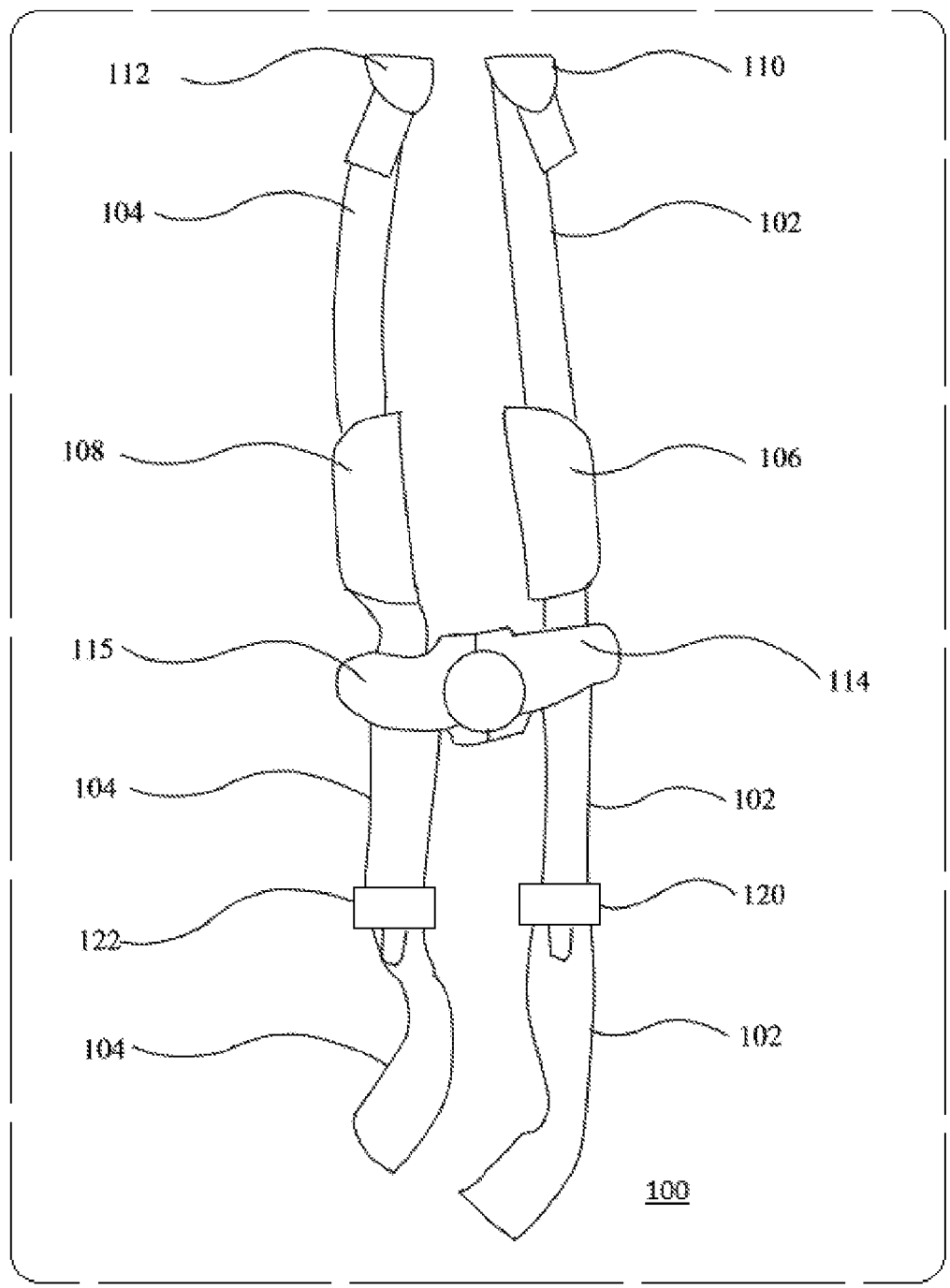
FIG. 1 is a front view of an embodiment of a vehicle seat harness, according to an implementation.
Figure 2:
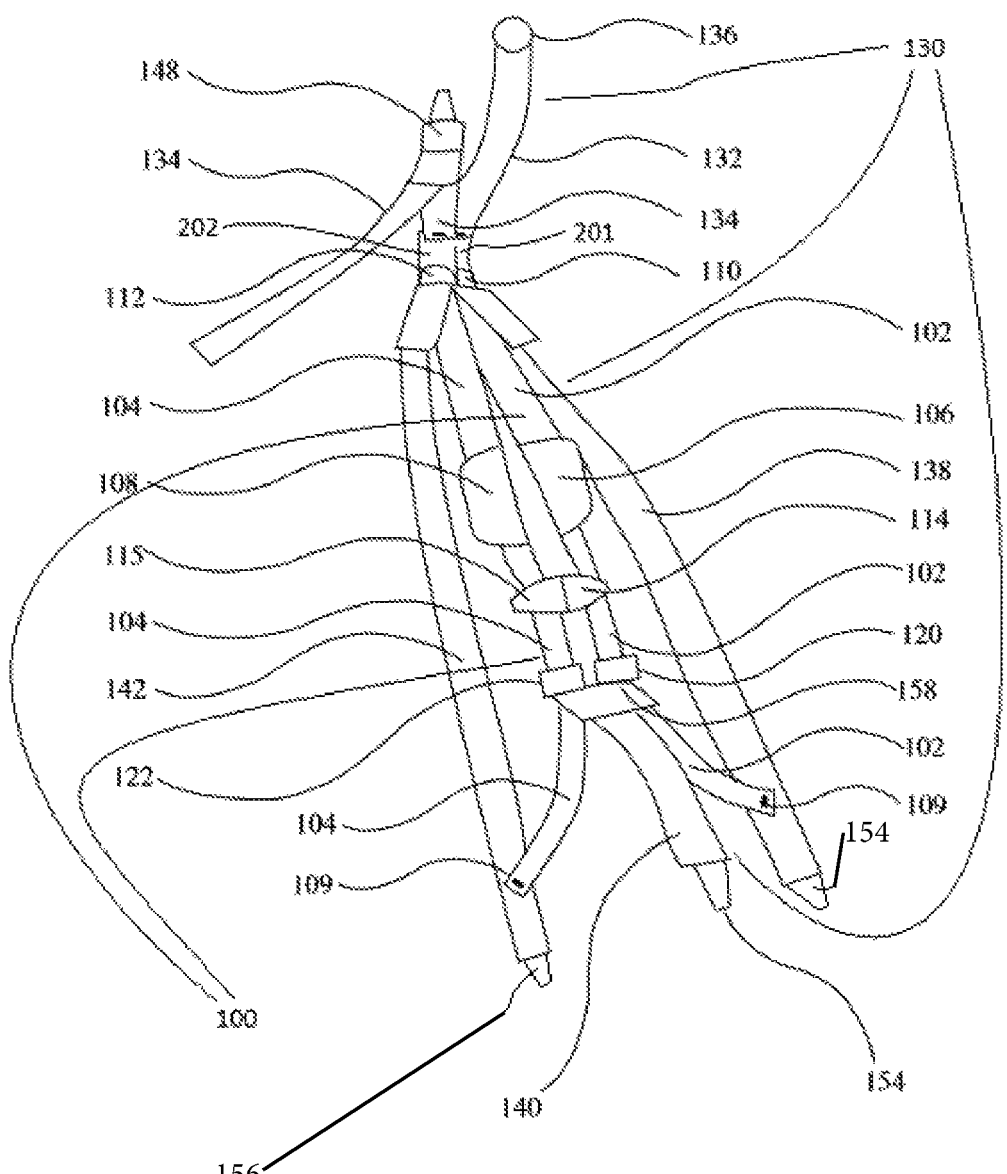
FIG. 2 is a front perspective view of one embodiment of the vehicle seat harness attached to one embodiment of a harness anchoring system, according to one implementation.

FIG. 1 is a front view of an embodiment of the vehicle seat harness 100. The vehicle seat harness 100 includes a left adjustable harness strap 102, a right adjustable harness strap 104, a left shoulder pad 106, a right shoulder pad 108, an upper left adjustable harness strap cleat 110, an upper right adjustable harness strap cleat 112, a left side of a chest buckle 114, a right side of a chest buckle 115, a lower left adjustable harness strap buckle insert 120 and a lower right adjustable harness strap buckle insert 122. The left adjustable harness strap 102 is connected to the left side chest buckle 114 and the right adjustable harness strap 104 is connected to the right side chest buckle 115. The left adjustable harness strap 102 is connected to the upper left adjustable harness strap cleat 110, which is connected to the upper left anchoring system strap 201 (FIG. 2). The right adjustable harness strap 104 is connected to the upper right adjustable harness strap cleat 112, which is connected to the upper right anchoring system strap 202 (FIG. 2). In an embodiment, the upper left adjustable harness strap cleat 110 and upper right adjustable harness strap cleat 112 are configured as "double D-rings". However the invention is not limited to this particular type of cleat.

Figure 7:
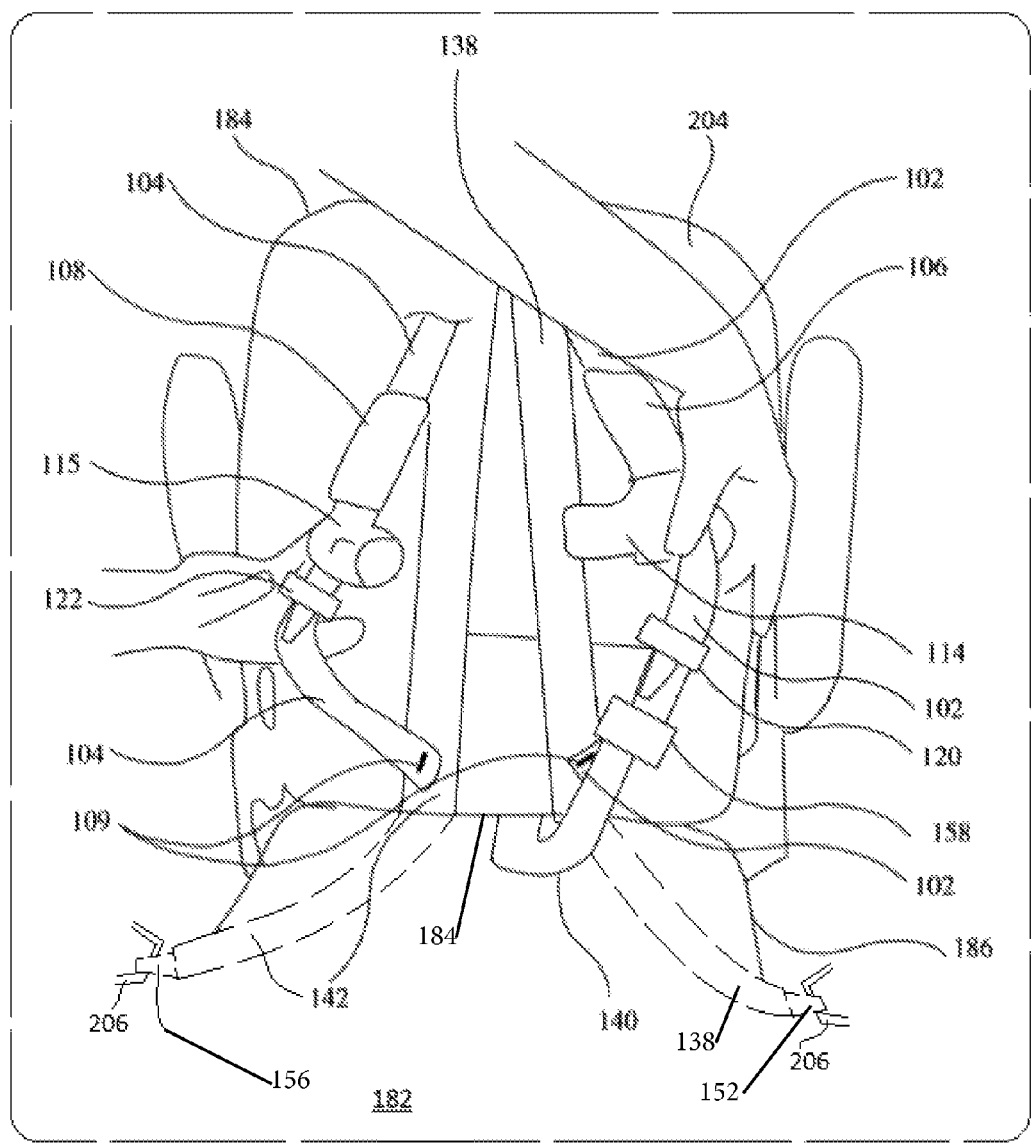
FIG. 7 is a front view of the vehicle seat harness anchoring system installed as viewed from the front side of a vehicle front seat, according to an implementation.
Figure 8:
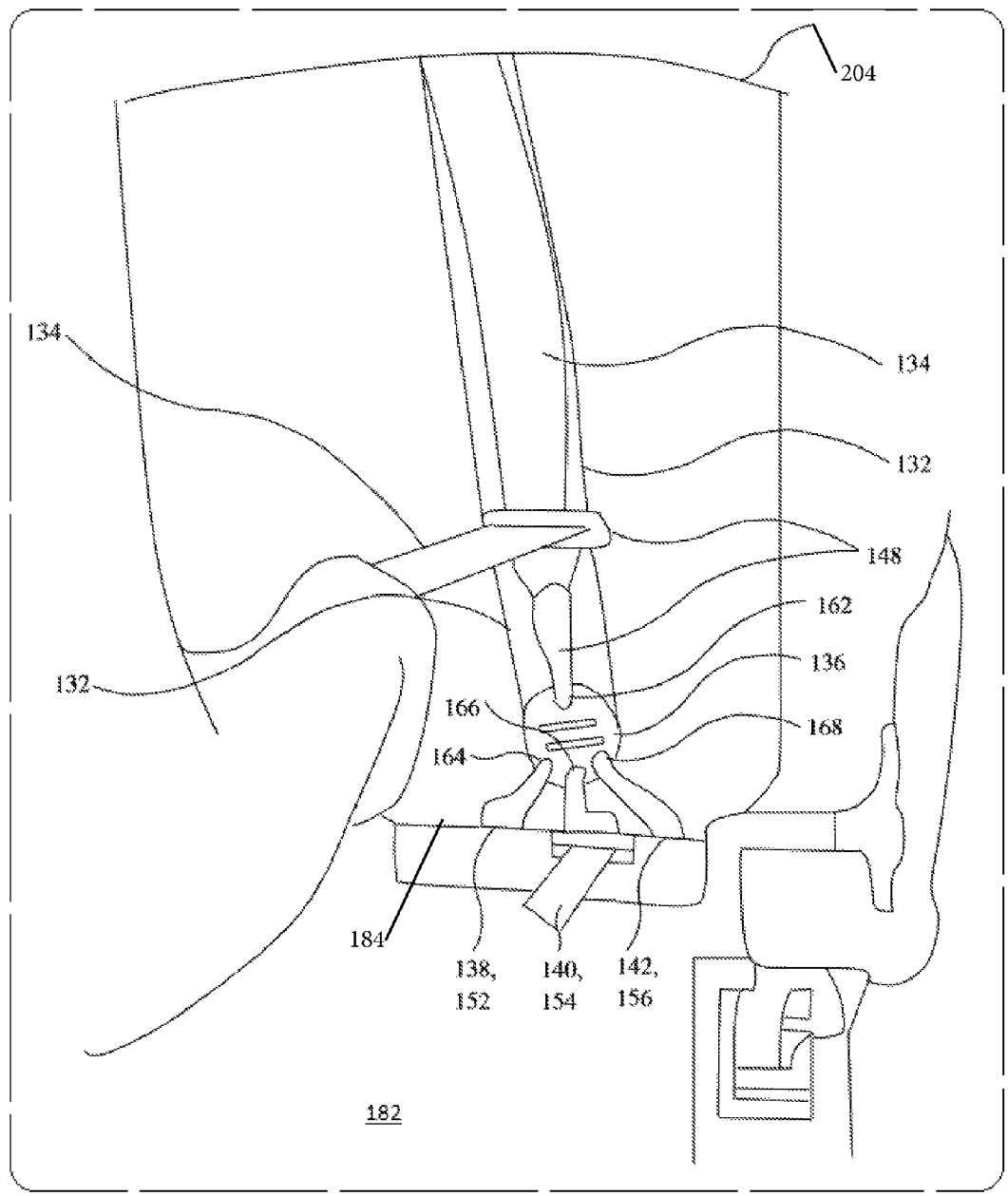
FIG. 8 is a rear view of the vehicle seat harness anchoring system installed as viewed from the rear side of a vehicle front seat, according to an implementation.

FIG. 2 is a front perspective view of one embodiment of the vehicle seat harness 100 attached to one embodiment of a harness anchoring system 130. The upper portion of the vehicle seat harness 100 is attached to the harness anchoring system 130 by attaching an upper portion of the upper left anchoring strap 132 to the upper left anchoring system strap 201 which connects to the upper left adjustable harness strap cleat 110, and the lower left anchoring strap 138 to the upper left adjustable harness strap cleat 110. Similarly, the upper portion of the vehicle seat harness 100 is also attached to the harness anchoring system by attaching the upper right adjustable anchoring strap 134 to the upper right anchoring system strap 202 which attaches to the upper right adjustable harness strap cleat 112, and the lower right anchoring strap 142 to the upper right adjustable harness strap cleat 112. Preferably the upper right anchoring system strap 202 and the upper left anchoring system strap 201 attach to each other, preferably by sewing, and the upper right adjustable anchoring strap 134 and the upper left anchoring strap 132 attach to the connected anchoring system straps 201 and 202. The anchoring system straps may, however, attach to the upper right adjustable anchoring strap 134 and the upper left anchoring strap 132 in any suitable manner. As illustrated on FIG. 4A, the lower left anchoring strap 138 and the lower right anchoring strap 142 are connected by sewing stitches 109. As illustrated on FIG. 2, the lower portion of the vehicle seat harness 100 is attached to the harness anchoring system 130 by sewing stitches 109 to stitch a lower portion of the left adjustable harness strap 102 to the lower left anchoring strap 138 as illustrated on FIG. 2. Similarly, the lower portion of the vehicle seat harness 100 is also attached to the harness anchoring system 130 by sewing stitches 109 to stitch a lower portion of the right adjustable harness strap 104 to the lower right anchoring strap 142 as also illustrated on FIG. 2. The harness anchoring system 130 in one embodiment has an upper left anchoring strap 132 and an upper right adjustable anchoring strap 134. An anchor plate 136 is attached to the upper left anchoring strap 132. The harness anchoring system 130 further includes a lower left anchoring strap 138, a lower middle adjustable anchoring strap 140 and a lower right anchoring strap 142. Each of the five anchoring straps (132, 134, 138, 140 and 142) has a free end and a fixed end. Attached to free end of the upper right anchoring strap 134 is anchor hook 148. Attached to the free end of the lower left anchoring strap 138 is an anchor hook 152. Attached to the free end of the lower middle adjustment anchoring strap 140 is an anchoring hook 154. Attached to the free end of the lower right anchoring strap 142 is an anchoring hook 156. In one embodiment, the anchoring devices 148, 152, 154 and 156 are configured as hooks (see FIGS. 6 and 6A). However, the anchoring devices 148, 152, 154 and 156 are not limited to hooks and may be any suitable buckle. The free end of anchoring devices 148, 152 and 156 may be attached to anchors 188 on a vehicle seat (see FIG. 4A) or on a vehicle floor (not shown) or are attachable to the anchor plate 136 attached to the upper right adjustable anchoring strap 134 when vehicle anchors are not available, or the use of the anchor plate is preferable. The free end of anchoring device 154 for the lower middle adjustable anchoring strap 140 is always attached to the anchor plate 136 (FIGS. 4A and 8). The fixed end of the five anchoring straps (132, 134, 138, 140 and 142) may attach to the vehicle seat harness by various methods. In an embodiment, the fixed end of the lower middle adjustable anchoring strap 140 has a two strap buckle 158 (FIGS. 5 and 7). The two strap buckle 158 is attached to the lower left adjustable harness strap buckle insert 120 of the left adjustable harness strap 102 and the lower right adjustable harness strap buckle insert 122 of the right adjustable harness strap 104 of the vehicle seat harness 100. In one embodiment, the two strap buckle 158 is configured as a chest buckle. In this embodiment, the left adjustable harness strap buckle insert 120 and the right adjustable harness strap buckle insert 122 (FIG. 5) are configured as latches received in the two strap buckle 158 configured as a chest buckle receiving two latches. However, the two strap buckle 158 is not limited to a pair of chest buckles and the left adjustable harness strap buckle insert 120 and the right adjustable harness strap buckle insert 122 are not limited to latches and either the two strap buckle 158 or the left adjustable harness strap buckle insert 120 and the right adjustable harness strap buckle insert 122 may be any suitable type of buckle. In an embodiment, the left adjustable strap buckle insert 120 and the right adjustable harness strap buckle insert 122 are movable relative to the left adjustable harness strap 102 and the right adjustable harness strap 104, respectively. The five anchoring straps (132, 134, 138, 140 and 142) (FIG. 8) each have a free end and a fixed end. In an embodiment, the fixed end of anchoring straps 132, 134, 138 and 142 are attached to the vehicle seat harness 100 by sewing a stitch 109 (FIG. 4A), to another anchoring strap 132, 134, 138 and 142, or by attachment to the upper left adjustable harness strap cleat 110 or to the upper right adjustable harness strap cleat 112 as discussed below in the description of FIG. 4A. The middle adjustable anchoring strap 140 is not sewn to the other four 132, 134, 138 and 142 anchoring straps in order to facilitate adjusting the length of the middle adjustable anchoring strap 140. In one preferred embodiment, only the upper right adjustable anchor strap 134 and not the upper left anchor strap 132 are required to properly mount the harness in a vehicle. The harness is designed to attach to a standard vehicle seat and provide a safe harness for a child. The harness is able to attach to a standard vehicle seat using the three lower anchor straps 138, 140, 142 and at least the upper right adjustable anchor strap 134, preferably by feeding the three lower anchor straps under the seat back 184 (FIG. 8) of the vehicle seat and hooking them into anchoring plate 136, and by hanging the upper right adjustable anchor strap 134 over the top of the seat back 204 of the vehicle seat and hooking it into anchoring plate 136. In another preferred embodiment, at least one of the three lower anchor straps 138, 140, 142 can hook into at least one vehicle anchor point 206 (FIG. 7).

Figure 3:
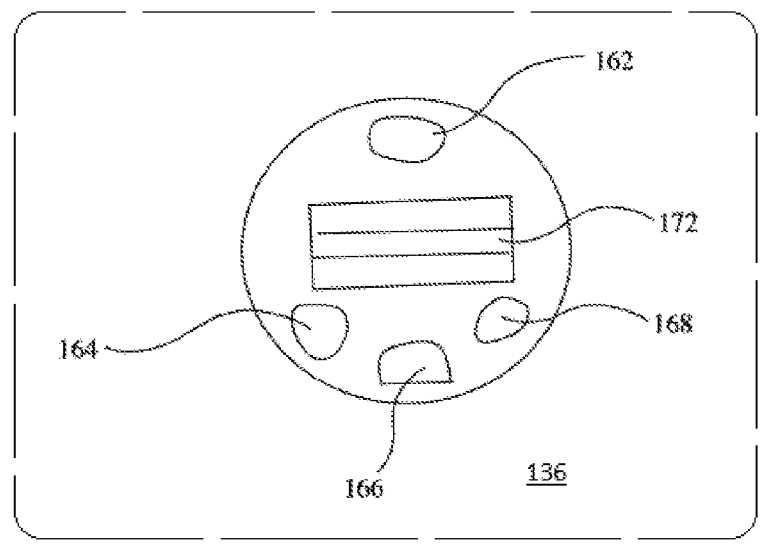
FIG. 3 is a detail view of the anchor plate which is attached to the upper left anchoring strap of the harness anchoring system, according to one implementation.

FIG. 3 is a detail view of the anchor plate 136 which is always attached to the upper left anchoring strap 132 (FIG. 2) of the harness anchoring system 130. As illustrated in FIG. 3, anchor plate 136 has an upper receiving orifice 162 for receiving the upper right adjustable anchoring strap 134 (FIG. 2) adjustable anchor hook 148 (FIG. 2). FIG. 8 illustrates anchor plate 136 also having a lower left receiving orifice 164 for receiving the lower left anchoring strap 138 anchor hook 152 (FIG. 2). The anchor plate 136 additionally has a lower middle receiving orifice 166 for receiving the lower middle adjustable anchoring strap 140 anchoring hook 154. The anchor plate 136 further has a lower right receiving orifice 168 for receiving the lower right anchoring strap 142 anchoring hook 156 (FIG. 4A). Also, the anchor plate has a retaining bar and orifice 172 (FIG. 3) to allow anchor plate 136 to be permanently mounted on the free end of upper left anchoring strap 132 by passing a lower end of upper left anchor strap 132 through the retaining bar and orifice 172 and then stitching the upper left anchor strap so that it is secured to the retaining bar and orifice 172.

Figure 4:
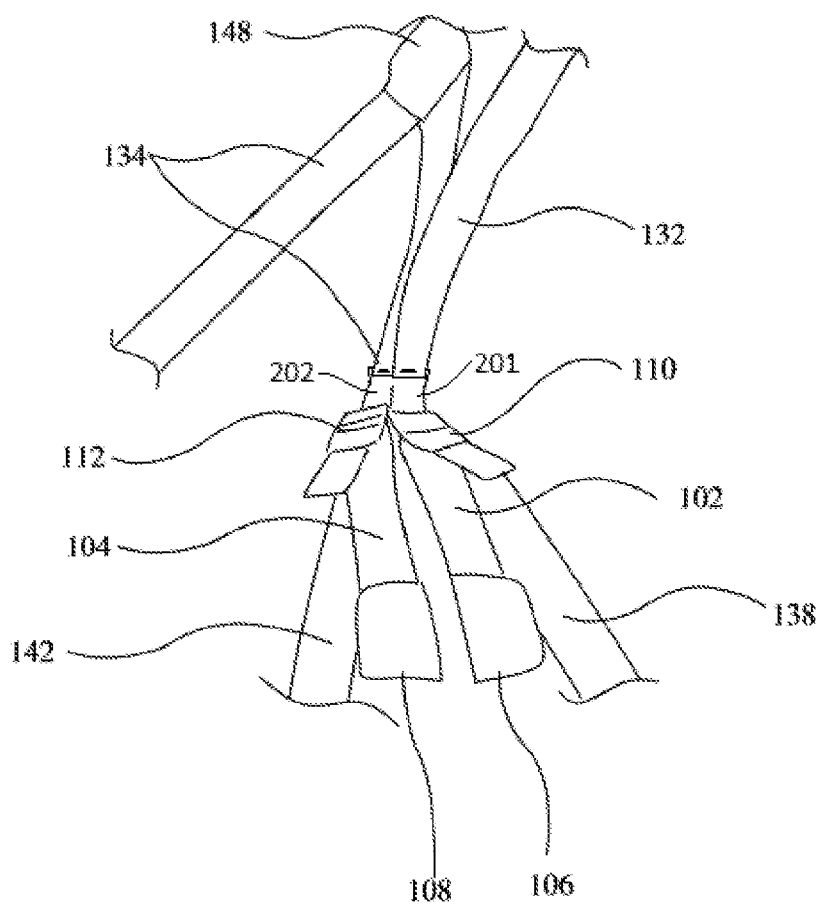
FIG. 4 is a detail view of the connection of the left adjustable harness strap and the right adjustable harness strap of the vehicle seat harness to the upper left anchoring strap, the upper right adjustable anchor strap, the lower left anchoring strap and lower right anchoring strap of the harness anchoring system from a front side of a vehicle seat before final anchoring of the anchoring system at a rear side of the vehicle seat or to vehicle anchoring points, according to an implementation.
Figure 4A:
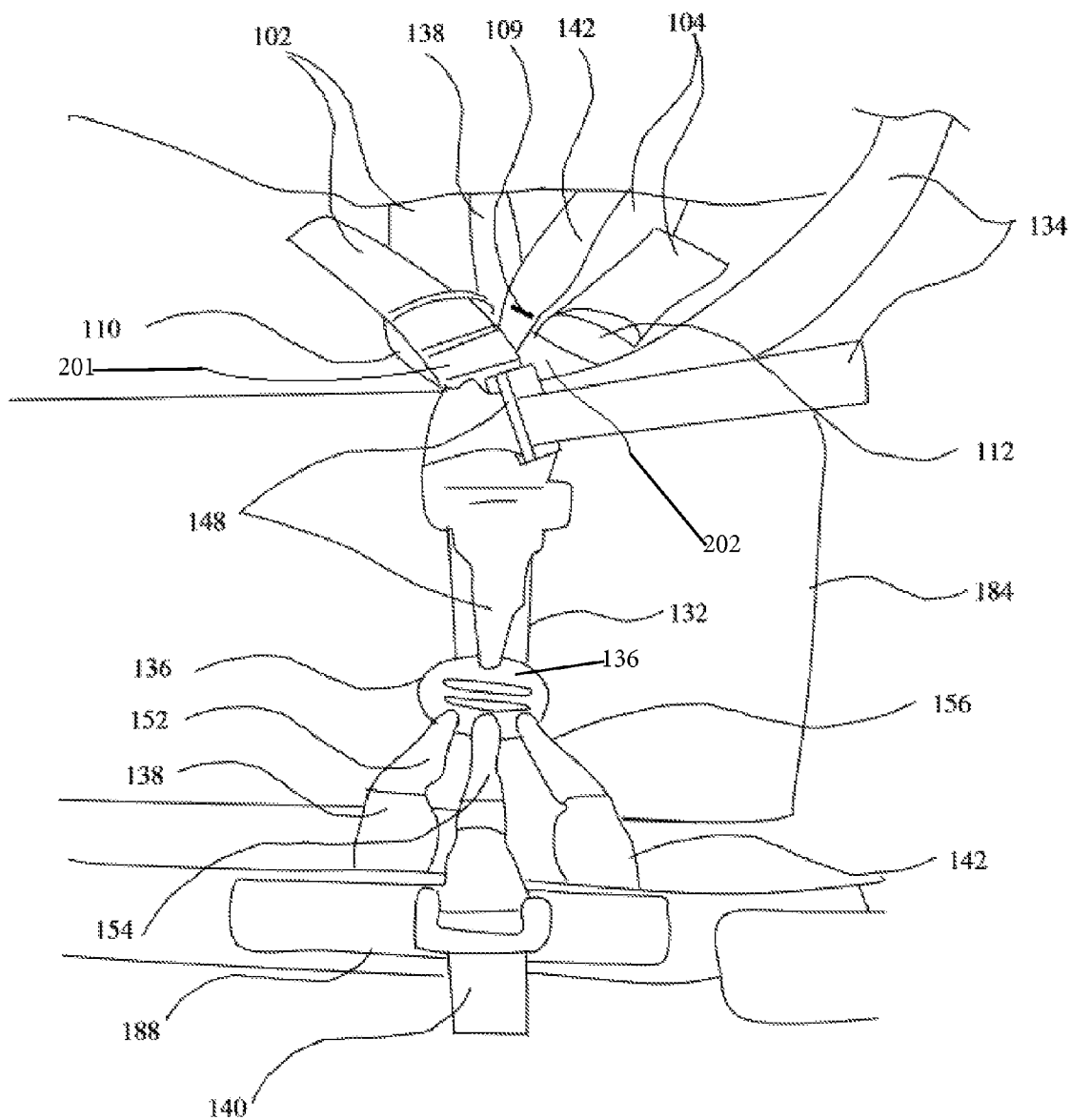
FIG. 4A is a detail view of the connection of the left adjustable harness strap and the right adjustable harness strap of the vehicle seat harness to the upper left anchoring strap, the upper right adjustable anchor strap, the lower left anchoring strap and lower right anchoring strap of the harness anchoring system from a rear side of a vehicle seat, according to another implementation.
Figure 5:
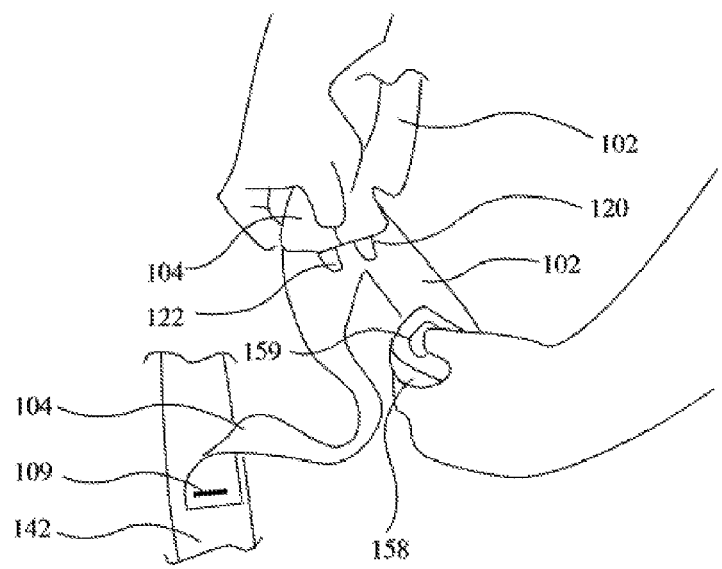
FIG. 5 is a detail view of the connection of the left adjustable harness strap and the right adjustable harness strap of the vehicle seat harness to the lower middle adjustable anchoring strap of the harness anchoring system, according to an implementation.

FIG. 4 is a detail view of the connection of the left adjustable harness strap 102 and the right adjustable harness strap 104 of the vehicle seat harness 100 to the upper left anchoring strap 132, the upper right adjustable anchoring strap 134, the lower left anchoring strap 138 and lower right anchoring strap 142 of the harness anchoring system 130 from a front side of a vehicle seat 182 (FIG. 7) before final anchoring of the anchoring system at a rear side of the vehicle seat 182 or to vehicle anchoring points 188 (FIG. 4A). The upper left 110 and upper right 112 buckles allow the left adjustable harness strap 102 and the right adjustable harness strap 104 to be adjustable in length. The upper right adjustable anchoring strap 134 is made adjustable in length at another location, as detailed in FIGS. 6A and 8. FIG. 4A is a detail view of the connection of the left adjustable harness strap 102 and the right adjustable harness strap 104 of the vehicle seat harness 100 to the upper right adjustable anchor strap 134, the lower left anchoring strap 138, the lower middle adjustable anchoring strap 140 and lower right anchoring strap 142 of the harness anchoring system 130 from a rear side of a vehicle seat 182. In an embodiment, one or both of an upper end of the upper left anchoring strap 132 and an upper end of the lower left anchoring strap 138 is fastened to an upper end of the upper left adjustable harness strap 102 by attachment to the upper left adjustable harness strap cleat 110. In this embodiment, one or both of an upper end of the upper right adjustable anchoring strap 134 and an upper end of the lower right anchoring strap 142 is fastened to of the upper left adjustable harness strap 102 by attachment to the upper right adjustable harness strap cleat 112. As noted above, and as illustrated in FIG. 4A, an upper portion of the lower left anchoring strap 138 and an upper portion of the lower right anchoring strap 142 are connected by sewing stitches 109. In an embodiment upper portions of one or more of anchoring straps 132, 134, 138 and 142 may also be attached to each other by sewing stitches 109. As noted above, the middle adjustable anchoring strap 140 is not stitched to any other anchoring straps 132, 134, 138 and 142 and is always attached to anchor plate 136.

FIG. 5 is a detail view of the connection of the left adjustable harness strap 102 and the right adjustable harness strap 104 of the vehicle seat harness 100 to the lower middle adjustable anchoring strap 140 (FIG. 2) of the harness anchoring system 130. As illustrated in FIG. 5, the lower left adjustable harness strap buckle insert 120 is configured as a latch and the lower right adjustable harness strap buckle insert 122 is also configured as a latch. The lower latches 120 and 122 are received into the two strap buckle 158 configured as a chest buckle with a release button 159. Although the lower left 120 and lower right 122 strap buckles are illustrated as latches in this embodiment, the lower left 120 and lower right 122 strap buckles are not limited to latches and the two strap buckle 158 is not limited to a chest buckle. FIG. 5 also illustrates right adjustable harness strap 104 sewn by stitching 109 to lower right anchoring strap 142.

Figure 6:
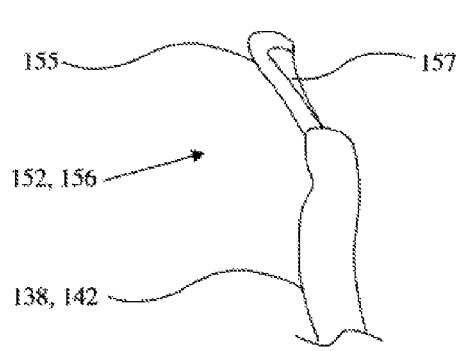
FIG. 6 is a detail view of the buckles of the non-adjustable anchoring straps, according to an implementation.
Figure 6A:
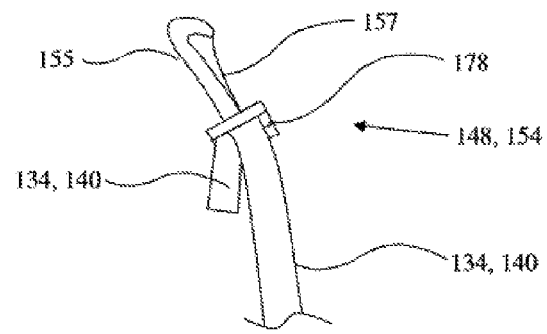
FIG. 6A is a detail view of the buckle of the adjustable anchoring straps, according to an implementation.

FIG. 6 is a detail view of the buckles 152 and 156 of the non-adjustable lower left 138 and lower right 142 anchoring straps of the harness anchoring system 130. As illustrated in FIG. 6, the buckles 152 and 156 are configured as hooks 155 with a leaf spring 157 in order to retain hooks 155 to be retained in receiving orifices 164 and 168 of anchor plate 136. FIG. 6A depicts a detail view of adjustable anchor hook 148 and 154 of the adjustable upper right 134 and lower middle 140 adjustable anchoring straps. As illustrated in FIG. 6A, the adjustable buckles 148 and 154 are also configured as hooks 155 which are received in the receiving orifices 162 and 166 of the anchor plate 136 (FIG. 8). The only difference between the buckles 152 and 156 for the non-adjustable straps 138 and 142 in FIG. 6 and the buckles 148 and 154 for the adjustable straps 134 and 140 in FIG. 6A, is that the buckles 148 and 154 in FIG. 6A also include an adjuster 178, similar to those used on backpack straps in order to allow the length of the adjustable straps 134 and 140 in FIG. 6A to be adjusted. Although the buckles 152 and 156 in FIG. 6 and the buckles 148 and 154 in FIG. 6A are illustrated as hooks 155 in this embodiment, the buckles 152 and 156 in FIG. 6 and the buckles 148 and 154 in FIG. 6A are not limited to hooks 155.

FIG. 7 is a front view of the vehicle seat harness 100 and harness anchoring system 130 installed as viewed from the front side of a vehicle front seat 182. As illustrated in FIG. 7, lower left anchoring strap 138 and lower right anchoring strap 142 have been fed through a gap between the lower portion of the seat back 184 and an upper portion of the seat base 186 to a rear side of the vehicle front seat 182 (FIGS. 7 and 8). FIG. 7 also illustrates the left side of chest buckle 114 and the right side of chest buckle 115 unbuckled, allowing for a person to fit into the vehicle seat harness 100. FIG. 7 further illustrates left adjustable harness strap 102 and right adjustable harness strap 104 of vehicle seat harness 100 disconnected from lower middle adjustable anchoring strap 140 to further facilitate allowing a person to fit into vehicle seat harness 100. As also illustrated in FIG. 7, lower middle adjustable anchoring strap 140 is additionally fed through the gap between seat back 184 and the seat base 186. Feeding the anchoring straps 138, 140 and 142 through the gap at the bottom of the seat back 184 facilitates keeping anchoring straps 138, 140 and 142 and vehicle seat harness 100 flush and snug to vehicle seat 182. The vehicle seat harness 100 and anchoring system 130 is illustrated in FIG. 7 as being installed in a "bucket" type front seat 182. However, the vehicle seat harness 100 and anchoring system 130 may be installed on any vehicle seat. In the case of a back seat of an automobile sedan, access to the trunk area of the automobile and slots available or cutout in the rear deck may be required for installation of the vehicle seat harness 100 and anchoring system 130 in the back seat of an automobile sedan.

FIG. 8 is a rear view of vehicle seat harness 100 and harness anchoring system 130 installed as viewed from the rear side of vehicle front seat 182. As illustrated in FIG. 8, upper left anchoring strap 132 with attached anchoring plate 136 and upper right adjustable anchoring strap 134 descend downward from the top of the seat back 204. The adjustable anchor hook 148 for the upper right adjustable anchoring strap 134 has been inserted into the anchor plate 136 upper receiving orifice 162. As also illustrated in FIG. 8, the lower left anchoring strap 138, the lower middle adjustable anchoring strap 140 and the lower right anchoring strap 142 have been fed under seat back 184 to the rear of the vehicle front seat 182. The anchor hook 152 for the lower left anchoring strap 138 has been inserted into the anchor plate 136 lower left receiving orifice 164. The anchoring hook 154 for lower middle adjustable anchoring strap 140 has been inserted into anchor plate 136 lower middle receiving orifice 166. The anchoring hook 156 for lower right anchoring strap 142 has been inserted into anchor plate 136 lower right receiving orifice 168. FIG. 8 further illustrates a user (not shown) adjusting the length of upper right adjustable anchoring strap 134 to facilitate secure anchoring of harness anchoring system 130 to vehicle front seat 182. The length of lower middle adjustable anchoring strap 140 may also be adjusted to facilitate secure anchoring of harness anchoring system 130 to vehicle front seat 182. If anchoring locations are available proximal the front seat 182 in FIG. 8, some, or all of anchoring straps 134, 138 and 142 may be anchored to the vehicle anchoring locations instead of anchor plate 136 attached to upper left anchoring strap 132.

In use of the embodiments of FIGS. 1-8, a user (not shown) locates vehicle seat harness 100 and harness anchoring system 130 at a desired seat in a vehicle. The user then feeds upper left anchoring strap 132 and upper right adjustable anchoring strap 134 over the top of seat back 204 to the rear of the seat. The user next feeds lower left anchoring strap 138, lower middle adjustable anchoring strap 140 and lower right anchoring strap 142 in a gap between the seat back 184 and the vehicle seat base 186 to the rear of the seat. The user then connects buckles 148, 152, 154 and 156 for anchoring straps 134, 138, 140 and 142, respectively, to receiving orifices 162, 164, 166 and 168, respectively, on the anchor plate 136. As noted above, the user may anchor some (FIG. 4A), or all of the buckles 148, 152 and 156 for anchoring straps 134, 138 and 142, respectively, to appropriate anchor points proximal the vehicle seat. As noted above, anchoring hook 154 for lower middle adjustable anchoring strap 140 is always connected to anchoring plate 136. After the anchoring straps 134, 138, 140 and 142 have been anchored to the vehicle, or the anchor plate 136, the length of the upper right adjustable anchoring strap 134 and/or the lower middle adjustable anchoring strap 140 is adjusted so that harness anchoring system 130 is securely anchored to any vehicle seat. Once harness anchoring system 130 is securely anchored to the vehicle seat, left side chest buckle 114 is unbuckled from right side chest buckle 115 and lower left adjustable harness strap buckle insert 120 and lower right adjustable harness strap buckle insert 122 are disconnected from two strap buckle 158 located on the lower middle adjustable anchoring strap 140. The user, who is generally a child, then sits on vehicle seat harness 100. Once the user (not shown) is seated in place, lower left adjustable harness strap buckle insert 120 and lower right adjustable harness strap buckle insert 122 are then reconnected to two strap buckle 158 on lower middle adjustable anchoring strap 140 and left side chest buckle 114 is then chest buckled to right side chest buckle 115. The left adjustable harness strap 102 and right adjustable harness strap 104 are then tightened as necessary so that the person is secured within vehicle seat harness 100. After the person is secured in vehicle seat harness 100, some adjusting of upper right adjustable anchoring strap 134 or lower middle adjustable anchoring strap 140 may be necessary for the person's comfort and safety. For the user to be released from vehicle seat harness 100, left side chest buckle 114 is unbuckled from right side chest buckle 115 and lower left adjustable harness strap buckle insert 120 and lower right adjustable harness strap buckle insert 122 are disconnected from two strap buckle 158, allowing the user to be free of restraint from vehicle seat harness 100. Once installed, vehicle seat harness 100 and harness anchoring system 130 may remain installed as long as desired, or may be removed at any time and relocated to another seat, or another vehicle. After the first use and adjustment, subsequent uses of vehicle seat harness 100 and harness anchoring system 130 should require only minimal time and effort.

As a person skilled in the prior art will recognize after examination of the previous detailed description and the figures and claims, modifications and changes may be made to the preferred embodiments of the invention without departing from the scope of the invention as defined in the following claims.

The invention claimed is:

1. A vehicle seat harness anchoring system wherein the vehicle seat harness comprises an left adjustable harness strap, an right adjustable harness strap and a chest buckle attached to the left adjustable harness strap and the right adjustable harness strap, wherein the left adjustable harness strap and right adjustable harness straps are coupled to an upper anchor strap, wherein the upper anchor strap is adapted to attach to an anchoring plate, wherein the vehicle seat harness anchoring system further comprises a lower right anchor strap attached to the right adjustable harness strap, a lower left anchor strap attached to the left adjustable harness strap, and a lower middle anchor strap detachably coupled to the left adjustable harness strap and the right adjustable harness strap, wherein the lower anchor straps wrap at least one of a) under and b) around the vehicle seat and temporarily couple to at least one of 1) the anchoring plate and 2) anchoring points attached to the vehicle, one, or more of an upper portion of the upper left anchoring strap and an upper portion of the lower left anchoring strap is directly attached to an upper left adjustable harness strap buckle which is located on an upper end of the left adjustable harness strap and one, or more of an upper portion of the upper right anchoring strap and an upper portion of the lower right anchoring strap is directly attached to an upper right adjustable harness strap buckle which is located on an upper end of the upper right adjustable harness strap, wherein the upper portion of the lower left anchoring strap is attached to the lower right anchoring strap by stitching.

2. A vehicle seat harness anchoring system wherein the vehicle seat harness comprises a left adjustable harness strap, a right adjustable harness strap and a left side of a chest buckle directly attached to the left adjustable harness strap and a right side of a chest buckle attached to the right adjustable harness strap, wherein the harness anchoring system includes an upper left anchoring strap, an upper right anchoring strap, a lower left anchoring strap, a lower middle anchoring strap and a lower right anchoring strap, wherein each of the upper left anchoring strap, the upper right anchoring strap, the lower left anchoring strap, the lower middle anchoring strap and the lower right anchoring strap have a free end, which is attached to one of an anchor plate and a vehicle anchoring point and a fixed end, which is attached to the vehicle seat harness, the free end of the upper left anchoring strap is directly attached to an anchor plate retaining bar and orifice anchor plate located on the anchor plate.

3. The vehicle seat harness anchoring system of claim 2 wherein the upper right anchoring strap, the lower left anchoring strap, the lower middle anchoring strap and the lower right anchoring strap each have an buckle attached to the free end of each of the upper right anchoring strap, the lower left anchoring strap, the lower middle anchoring strap and the lower right anchoring strap.

4. The vehicle seat harness anchoring system of claim 3 wherein the anchor plate has a plurality of receiving orifices.

5. The vehicle seat harness anchoring system of claim 4 wherein the buckle attached to the free end of the upper right anchoring strap, the lower left anchoring strap, the lower middle anchoring strap and the lower right anchoring straps are received in one of the plurality of receiving orifices in the anchor plate.

6. A vehicle seat harness anchoring system wherein the vehicle seat harness comprises a left adjustable strap, a right adjustable strap and a chest buckle directly attached to the upper left adjustable strap and the upper right adjustable strap, wherein the harness anchoring system includes an upper right anchoring strap, a lower left anchoring strap, a lower middle anchoring strap and a lower right anchoring strap, wherein one end of the upper left anchoring strap is directly attached to an anchor plate retaining bar and orifice anchor plate located on the anchor plate, wherein the upper right anchoring strap, the lower left anchoring strap, the lower middle anchoring strap and the lower right anchoring strap each have an buckle attached to an end of the upper right anchoring strap, the lower left anchoring strap, the lower middle anchoring strap anchoring strap, and the lower right anchoring straps, wherein the anchor plate has a plurality of receiving orifices, the buckles of each of the upper right anchoring strap, the lower left anchoring strap and the lower right anchoring are received in one of the plurality of receiving orifices in the anchor plate, wherein the upper left anchoring strap, the lower left anchoring strap and the lower right anchoring strap are not adjustable in length, wherein the upper right anchor strap and the lower middle anchoring strap are adjustable in length, wherein the left adjustable harness strap and the right adjustable harness strap are adjustable in length, wherein one end of the lower middle anchoring strap is attached to one of the plurality of receiving orifices in the anchor plate and the other end of the lower middle anchoring strap has a two strap buckle which is attached to a lower left adjustable harness strap buckle on the vehicle seat harness left adjustable strap and to a lower right adjustable harness strap buckle on the vehicle seat harness right adjustable strap, wherein the lower left adjustable harness strap buckle is movable along the vehicle seat harness left adjustable strap and the lower right adjustable harness strap buckle is movable along the vehicle seat harness right adjustable strap.

7. The vehicle seat harness anchoring system of claim 1 wherein the lower middle anchoring strap is attached to a buckle adapted to detachably couple to both a buckle insert attached to the left adjustable harness strap and a buckle insert attached to the right adjustable harness strap.

8. The vehicle seat harness anchoring system of claim 7 wherein the harness is adapted to be installed on a vehicle seat by wrapping the three lower anchor straps under the seat back of the vehicle seat and coupling the three lower anchor straps to an anchoring plate behind the vehicle seat and by wrapping at least one upper anchor strap over the seat back of the vehicle seat and coupling the at least one upper anchor strap to the anchoring plate.

9. The vehicle seat harness anchoring system of claim 8 wherein both of the upper right anchoring strap and lower middle anchoring strap are adjustable in length.

10. The vehicle seat harness anchoring system of claim 7 wherein the harness is adapted to be installed on a vehicle seat by coupling at least one of the three lower anchor straps to at least one vehicle anchor point and wrapping any of the three lower anchor straps not coupled to the at least one vehicle anchor points under the seat back of the vehicle seat and coupling the three lower anchor straps to an anchoring plate behind the vehicle seat and by wrapping at least one upper anchor strap over the seat back of the vehicle seat and coupling the at least one upper anchor strap to the anchoring plate.

11. The vehicle seat harness anchoring system of claim 10 wherein the upper left anchoring strap, the lower left anchoring strap and the lower right anchoring strap are all not adjustable in length.

12. The vehicle seat harness anchoring system of claim 1 wherein a lower end of the left adjustable harness strap is stitched to the lower left anchoring strap and a lower end of the right adjustable harness strap is stitched to the lower right anchoring strap.

* * * * *